(12) United States Patent
Rietzler et al.

(10) Patent No.: US 8,427,322 B2
(45) Date of Patent: Apr. 23, 2013

(54) SMARTCARD AND METHOD FOR THE PRODUCTION OF A SMARTCARD

(75) Inventors: Manfred Rietzler, Marktoberdorf (DE); Philippe Castano, Bangkok (TH)

(73) Assignee: Smartrac IP B.V. (NL)

( * ) Notice: Subject to any disclaimer, the term of this patent is extended or adjusted under 35 U.S.C. 154(b) by 665 days.

(21) Appl. No.: 12/308,794

(22) PCT Filed: May 25, 2007

(86) PCT No.: PCT/EP2007/004661
§ 371 (c)(1),
(2), (4) Date: Dec. 23, 2008

(87) PCT Pub. No.: WO2008/000325
PCT Pub. Date: Jan. 3, 2008

(65) Prior Publication Data
US 2009/0289766 A1    Nov. 26, 2009

(30) Foreign Application Priority Data
Jun. 30, 2006    (DE) .......................... 10 2006 030 819

(51) Int. Cl.
*G08B 13/14*    (2006.01)

(52) U.S. Cl.
USPC ....................................... 340/572.7; 343/895

(58) Field of Classification Search .............. 340/572.7, 340/572.1, 10.1; 343/895; 235/492
See application file for complete search history.

(56) References Cited

U.S. PATENT DOCUMENTS

| | | | |
|---|---|---|---|
| 6,028,564 A * | 2/2000 | Duan et al. | 340/572.7 |
| 6,088,230 A | 7/2000 | Finn et al. | |
| 6,774,865 B1 * | 8/2004 | Serra | 343/895 |
| 7,286,053 B1 * | 10/2007 | Gudeman et al. | 340/572.1 |
| 7,928,918 B2 * | 4/2011 | Caruana et al. | 343/745 |
| 2001/0011012 A1 | 8/2001 | Hino et al. | |
| 2003/0019941 A1 | 1/2003 | Altwasser et al. | |
| 2004/0124983 A1 * | 7/2004 | Kuroda et al. | 340/572.1 |
| 2004/0130500 A1 * | 7/2004 | Takei | 343/895 |
| 2004/0256468 A1 * | 12/2004 | Akiho et al. | 235/492 |
| 2006/0237544 A1 * | 10/2006 | Matsuura et al. | 235/492 |
| 2007/0146138 A1 * | 6/2007 | Phipps et al. | 340/572.7 |
| 2008/0198078 A1 | 8/2008 | Caruana et al. | |

FOREIGN PATENT DOCUMENTS

| | | |
|---|---|---|
| DE | 19646209 A1 | 5/1997 |
| DE | 19835965 A1 | 12/1999 |

(Continued)

OTHER PUBLICATIONS

"International Application Serial No. PCT/EP2007/004661, International Search Report mailed Sep. 20, 2007", (w/ English Translation), 4 pgs.

*Primary Examiner* — Thomas Mullen
(74) *Attorney, Agent, or Firm* — Schwegman Lundberg & Woessner, P.A.

(57) ABSTRACT

The invention relates to a smartcard, particularly an electronic prepayment card, identification card or similar, with at least one transponder unit, and to a method for producing such a smartcard, wherein the transponder unit has at least one chip and at least one antenna connected to the chip, wherein the antenna is made from a conductor that is arranged on an antenna substrate, wherein the extension of the antenna is limited to a patch of the antenna substrate and the antenna has a plurality of conducting lead with at least two windings separated from each other, which windings are arranged so that their axes are at least partly parallel to an axis of symmetry of the smartcard.

8 Claims, 3 Drawing Sheets

FOREIGN PATENT DOCUMENTS

| | | |
|---|---|---|
| DE | 10113476 C1 | 4/2003 |
| DE | 19525933 C5 | 2/2004 |
| EP | 0753180 B1 | 1/2001 |
| WO | WO-2007/025934 A1 | 3/2007 |

* cited by examiner

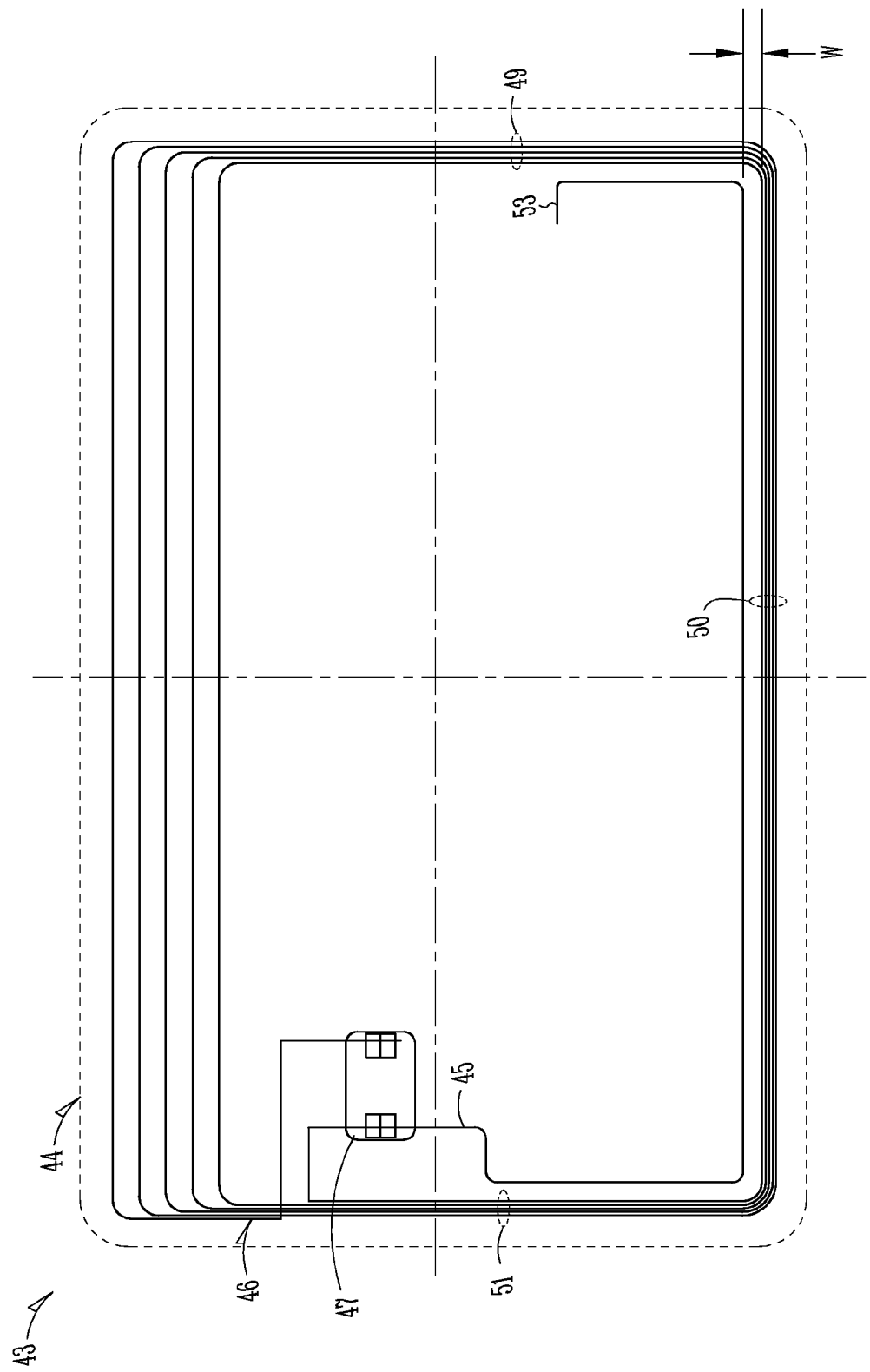

SMARTCARD AND METHOD FOR THE PRODUCTION OF A SMARTCARD

RELATED APPLICATIONS

This application is a nationalization under 35 U.S.C. 371 of PCT/EP2007/004661, filed on May 25, 2007, and published as WO 2008/000325 A1 on Jan. 3, 2008, which claimed priority under 35 U.S.C. 119 to German Patent Application Serial No. 10 2006 030 819.0, filed Jun. 30, 2006; which applications and publication are incorporated herein by reference and made a part hereof.

TECHNICAL FIELD

The technical field of the invention relates to smartcards with inductively coupled transponders, such as are used in so-called "RFID systems".

BACKGROUND OF THE INVENTION

Passive, inductively coupled transponder units essentially include a chip as a data carrier and a large-area coil that functions as an antenna. When used in a smartcard, electronic prepayment card or similar, the transponder unit is enclosed between various laminate layers of the card and can be read out without contact by a transmitting or reader unit or directly using external contact areas on the surface of the card.

BRIEF SUMMARY OF THE INVENTION

The present invention relates to a smartcard, particularly an electronic prepayment card, identification card or similar, and to a method for producing such a smartcard with at least one transponder unit, the transponder unit having at least one chip and at least one antenna connected to the chip, wherein the antenna is made from a conductor that is arranged on an antenna substrate, wherein the extension of the antenna is limited to a patch of the antenna substrate, and the antenna has a plurality of conducting leads with at least two windings separated from each other, which windings are at least partly arranged so that their axes are parallel to an axis of symmetry of the smartcard.

In passive transponder units, the energy required for contactless readout of the chip is supplied by the transmitting or reader unit. For this purpose, a powerful, high-frequency electromagnetic field is generated by an antenna coil of a reader unit and penetrates an antenna coil of a transponder unit located at some distance from the reader unit. A voltage is generated at the antenna coil of the transponder unit by induction, the voltage is rectified in a chip and serves as the energy supply for the chip. A capacitor is connected in parallel to the antenna coil of the transponder unit and, combined with the winding inductor, generates a parallel oscillating circuit at a resonance frequency that is tuned to a transmitting frequency of the reader unit. Data is transmitted from the transponder unit to the reader unit by so-called "load modulation", in which a load resistor on the antenna of the transponder unit is switched on and off, thereby causing a change in the voltage at the reader unit's antenna. Since this voltage change is very slight and can only be detected by sophisticated technical means, the load resistor is switched on and off at a high cycle speed, thereby generating a subcarrier frequency that is different from the transmitting frequency of the reader unit and can be detected relatively easily. Use of this method is also particularly widespread in a high-frequency range of about 13.56 MHz.

In order to optimize the response sensitivity of an RFID system of this kind, the resonance frequency of the transponder unit should match the transmitting frequency of the reader unit reasonably exactly. The desired resonance frequency may be formed by additional compensating capacitors on the chip. However, in the high frequency range the capacitance required is usually so small that the input capacitance of the chip combined with the parasitic capacitance of the transponder coil or antenna is sufficient for this purpose.

It is also necessary to adjust the input impedance of the antenna to match the input impedance of the chip. The impedances in the chip and the antenna may be matched using discrete components, but this is undesirable in smartcards of the type described above because of the associated high production costs. A clever antenna design has made it possible to structure the input impedance of the antenna such that it is a complex conjugate of the input impedance on the chip. As a result, the power matching between the chip and the antenna is performed by the antenna on its own.

Galvanic methods and circuit placing techniques for designing a transponder antenna of such kind are known from the related art. In particular, patents DE 195 25 933 C5 and EP 0 753 180 B1 describe a method for designing an antenna coil from a wire by placing the wire on a carrier substrate of a smartcard of the type described above. According to this method, the windings of the antenna wire are arranged on the carrier substrate in the form of a coil and are connected thereto. The geometric design of a coil and thus also the antenna design may easily be changed without excessive expense when this method is used.

In the case of smartcards with embossing, for example credit cards, the area for placing an antenna coil is severely limited due to the embossing and also any outer contact area of the chip, which means that very little space is left at the edges of the smartcard for placing the coil. The distance between windings of the antenna coil must therefore be kept quite small in these areas. Moreover, identical smartcards of one model may also contain chips from different manufacturers, which have differing input impedances and capacitances. If the geometrical design of the antenna in a limited surface area on the smartcard is to be used for matching the power of the antenna with that of the chip and for tuning the resonance frequency of the transponder unit, the antenna coil must have a geometric shape specifically designed for this purpose.

The object of the present invention is to propose a smartcard having at least one transponder unit, and a method for producing such a smartcard that enables the antenna to be matched to the transponder chip easily by virtue of the geometric design of the antenna coil, without the need for additional discrete components or adaptations of the transponder chip, wherein the design of the antenna coil is to take place within a limited area of the smartcard.

On the smartcard according to various embodiments described herein, at least one conducting lead of an antenna of a transponder unit is arranged asymmetrically with respect to at least one second conducting lead extending parallel thereto, in such manner that a winding separation distance of a first conducting lead differs from the winding separation distance of a second conducting lead, such that a resulting resonance frequency of the transponder unit corresponds to a frequency emitted by a reader unit, and that power matching takes place between an antenna and a chip of the transponder unit.

The asymmetrical arrangement of the conducting leads relative to each other due to the conformation of differing winding separation distances advantageously enables the matching between chip and antenna described above in terms of impedance and a predefined resonance frequency. Relatively large winding separation distances may be created in a patch of the antenna substrate, which patch is located in an overlapping area with a magnetic strip, and in which neither embossing nor external contact surfaces of a chip may be disposed. The winding separation distance of a conducting lead that is located in a relatively narrow area of a patch of the antenna substrate may be relatively small compared with the winding separation distances of conducting leads in other areas, where more space is available.

In a particularly advantageous embodiment, the conductor may be constructed from a wire. The antenna may be formed in a circuit placing method in which it is easily possible to change the geometric shape of the antenna during the production process. In this way, the antenna may be adapted to various chip series from different manufacturers without difficulty.

In a particularly advantageous embodiment of the smartcard, a winding separation distance of a third conducting lead may differ from the winding separation distances of a first and a second conducting lead.

Similarly, a winding separation distance of a fourth conducting lead may differ from those of the first, second and third conducting leads. The design of conducting leads having differing winding separation distances opens up the possibility of a wide range of geometric combinations in terms of matching the antenna and the chip.

In further advantageous embodiments of the smartcard, a conductor of the antenna may be routed over the conductor connection surfaces of the chip to serve as a compensation loop, wherein a remaining wire end is not contacted, thus remains free and has a capacitive effect on the antenna coil. This in turn offers an additional option for adapting the antenna, wherein the electrical properties may be influenced by the distance of the winding from the adjacent conductor and by the length of the remaining free wire end. The antenna may also be matched by laying a conductor in a meandering pattern.

In the method according to the invention for producing a smartcard, a resulting resonance frequency of the transponder unit, which is modified depending on the capacitance and impedance of a chip, is designed to match a frequency emitted by a reader unit in such manner that the outputs of the antenna and the chip are matching. The matching between antenna and chip is achieved by changing the geometry of the antenna, the change taking the form of placing the antenna on a substrate in such manner that least one conducting lead is arranged asymmetrically with respect to at least a second conducting lead extending parallel thereto, with the result that the winding separation distance of the first conducting lead differs from the winding separation distance of the second conducting lead.

Further advantageous embodiments of the method for producing a smartcard will be apparent from the descriptions of features contained herein.

BRIEF DESCRIPTION OF THE SEVERAL VIEWS OF THE DRAWINGS

In the following, the invention will be explained in greater detail with reference to the attached drawing.

In the drawing:

FIG. 3: is a plan view of a second embodiment of a transponder unit of a smartcard.

DETAILED DESCRIPTION OF THE INVENTION

Figure 1:
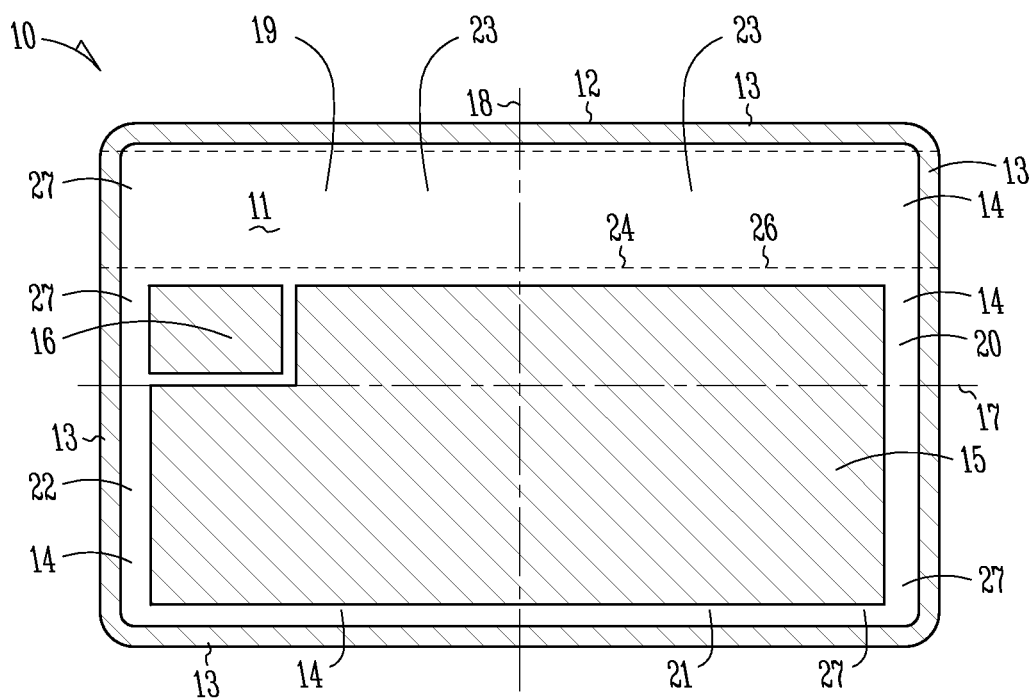
FIG. 1 is a plan view of the patches of a smartcard.

FIG. 1 shows a smartcard 10 with a card surface 11 within a card contour 12. Along card contour 12, card 10 has an edge area 13 that surrounds a patch 14. In turn, patch 14 encloses an embossing surface 15, within which embossing—not shown here—may be applied, and a chip surface 16, within which a chip—not shown here—may be placed. The areas defined by embossing surface 15 and chip surface 16 are arranged inside patch 14 such that communicating patch zones 19, 20, 21 and 22 are formed in patch 14. The antenna geometries shown in FIG. 2 and FIG. 3 may be formed inside these patch zones 19, 20, 21 and 22, whereas embossing surface 15, chip surface 16 and edge area 13 are not intended for the formation of such an antenna.

Patch zones 19, 20, 21 and 22 are arranged essentially parallel to the axes of symmetry 17 and 18 of smartcard 10, wherein particularly patch zone 19 is relatively large compared to patch zones 20, 21 and 22. A magnetic strip 24 is arranged on a patch 23 that partially covers patch 14 and edge area 13 and is delimited by two longitudinal edges 25 and 26 that extend parallel to axis of symmetry 17 of smartcard 10 and are represented here by dashed lines. Thus a contiguous antenna area 27 is formed from individual patch zones 19, 20, 21 and 22, within which the windings of an antenna may be formed, for instance by laying a wire conductor.

Figure 2:
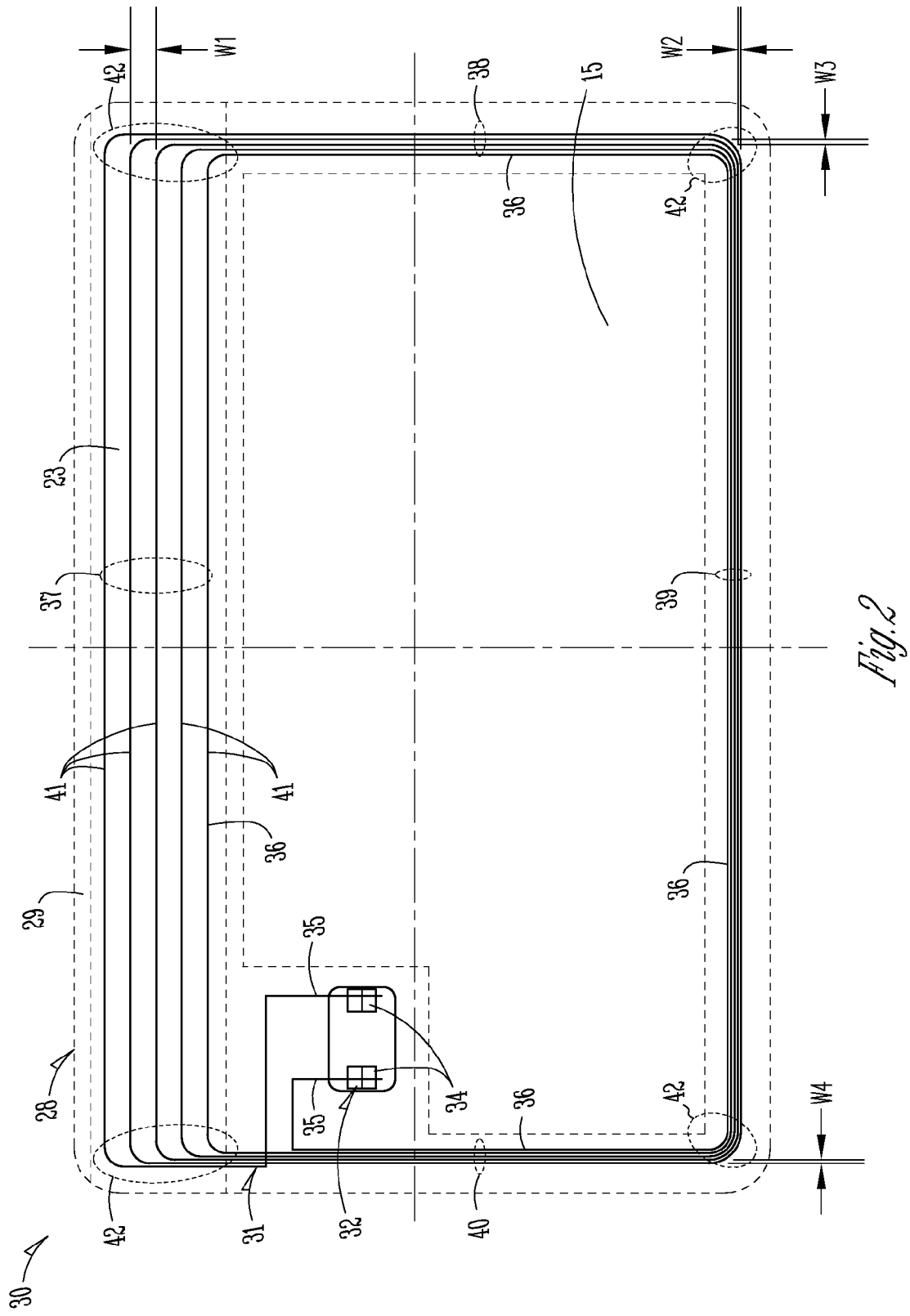
FIG. 2: is a plan view of a first embodiment of a transponder unit of a smartcard.

FIG. 2 shows a smartcard 30 having a transponder unit 28 that is arranged on an antenna substrate 29 of the smartcard 30. Transponder unit 28 is furnished with an antenna 31 and a chip module 32, which module is equipped with contact surfaces 34 for contacting a chip—not shown here—with antenna 31. Conductor ends 35 of antenna 31 are connected to contact surfaces 34 for this purpose.

Antenna 31 is made from a conductor 36 that has been arranged in conducting leads 37, 38, 39 and 40 in windings 41 that are separated from each other by a distance. In this embodiment, conducting leads 37, 38 39 and 40 are each created with differing winding separation distances W1, W2, W3 and W4. Each of winding separation distances W1, W2, W3 and W4 is different from the other three, winding separation distance W1 being particularly greater than the other three winding separation distances W2, W3 and W4. Conductor 36 is formed as a curved section 42 in each of the transitions between conducting leads 37, 38, 39 and 40.

The conducting leads 37, 38, 39 and 40 of antenna 31 as shown in FIG. 2 are located in the antenna area 27 shown in FIG. 1. As indicated in FIG. 1, a magnetic strip 24 and an embossment may be created on embossing surface 15 and patch 23.

FIG. 3 shows a smartcard 43 with a transponder unit 44. Unlike the transponder unit 28 shown in FIG. 2, a conducting end 45 of an antenna 46 is routed across a contact surface 47. Conducting end 45 extends parallel to conducting ends 49, 50 and 51 at a winding separation distance W, conducting end 45 being constructed as a compensating loop, the end 53 of which loop is routed at a right angle away from conducting lead 49.

The invention claimed is:

1. A smartcard comprising:
   at least one transponder unit, the transponder unit having at least one chip and at least one antenna connected to the chip,
   the transponder unit including a card surface having an edge area that surrounds the card surface to form a patch area, the patch area enclosing an embossing surface and a chip surface both within the patch area, the embossing surface and the chip surface arranged within the patch area so as to form within the patch area an antenna area including a plurality of communicating patch zones, the plurality of communicating patch zones including at least a first communicating patch zone and a second communicating patch zone, the antenna area and each of the plurality of communicating patch zones formed inside the patch area but outside of the embossing surface and outside of the chip surface so as to form the antenna area, wherein the antenna is arranged on the card surface and within the antenna area, wherein the antenna is made from at least one conductor formed to include a plurality of conducting leads, each of the plurality of conducting leads including at least two windings separated from each other by a winding separation distance on the surface, wherein a first one of the plurality of conducting leads is arranged to be at least partially formed within the first communicating patch zone of the plurality of communicating patch zones, and to have a first winding separation distance between the at least two windings of the first one of the plurality of conducting leads, wherein a second one of the plurality of conducting leads is arranged to be at least partially formed within the second communicating patch zone of the plurality of communicating patch zones, and to have a second winding separation distance between the at least two windings of the second one of the plurality of conductive leads, and wherein the first winding separation distance differs from the second winding separation distance such that a resulting resonance frequency of the transponder unit corresponds to a predetermined frequency, the predetermined frequency operable to be emitted by a reader unit and received by the smartcard, and wherein power matching takes place between the antenna and the chip.

2. The smartcard according to claim 1, wherein the conductor is formed from a wire.

3. The smartcard according to claim 1, wherein the plurality of conducting leads includes a third one of the plurality of conducting leads, the third one of the plurality of conducting leads having a third winding separation distance between the at least two windings of the third one of the plurality of conducting leads, wherein the third winding separation distance differs from both the first winding separation distance and the second winding separation distance.

4. The smartcard according to claim 3, wherein the plurality of conducting leads includes a fourth one of the plurality of conducting leads, the fourth one of the plurality of conducting leads having a fourth winding separation distance between the at least two windings of the fourth one of the plurality of conductive leads, wherein the fourth winding separation distance differs from each of the first winding separation distance, the second winding separation distance, and the third winding separation distance.

5. A method for producing a smartcard with a transponder unit that includes at least one chip and at least one antenna, comprising:

forming an antenna by arranging a conductor on an antenna substrate of the smartcard so that a resulting resonance frequency of the transponder unit is at least in part determined depending on a capacitance and an impedance of the chip and matches a frequency operable to be emitted by a reader unit, the reader unit operable to communicate with the smartcard, and an antenna impedance of the antenna matches an impedance of the at least one chip, coupling the antenna to the at least one chip, wherein forming the antenna includes forming the conductor so as to include a plurality of conductive leads, each of the plurality of conductive leads including at least two windings separated by a winding separation distance, wherein a first one of the plurality of conducting leads is arranged to be at least partially formed within a first communicating patch zone on the antenna substrate and to have a first winding separation distance between the at least two windings of the first one of the plurality conducting leads, and wherein a second one of the plurality of conducting leads is arranged to be at least partially formed within a second communicating patch zone on the antenna substrate and to have a second winding separation distance between the at least two windings of the second one of the plurality of conducting leads so that the second winding separation distance is different from the first winding separation distance.

6. The method according to claim 5, wherein forming the antenna further includes:

forming the conductor to include a third conducting lead on the antenna substrate, the third conducting lead having a third winding separation distance between the at least two windings of the third conducting lead, wherein the third winding separation distance is different from both the first winding separation distance and the second winding separation distance.

7. The method according to claim 6, wherein forming the antenna further includes:

forming the conductor to include a fourth conducting lead on the antenna substrate, the fourth conducting lead having a fourth winding separation distance between the at least two windings of the fourth conducting lead, wherein the fourth winding separation distance is different from each of the first winding separation distance, the second winding separation distance, and the third winding separation distance.

8. The method according to claim 5, wherein forming the antenna by arranging a conductor includes forming the conductor from a wire.

* * * * *

UNITED STATES PATENT AND TRADEMARK OFFICE
CERTIFICATE OF CORRECTION

PATENT NO. : 8,427,322 B2
APPLICATION NO. : 12/308794
DATED : April 23, 2013
INVENTOR(S) : Rietzler et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 783 days.

Signed and Sealed this
Eighth Day of September, 2015

Michelle K. Lee
*Director of the United States Patent and Trademark Office*